(12) United States Patent
Gungerich et al.

(10) Patent No.: US 6,656,356 B2
(45) Date of Patent: Dec. 2, 2003

(54) AERATED IMMERSED MEMBRANE SYSTEM

(75) Inventors: Christian Gungerich, Duesseldorf (DE); Pierre Lucien Côté, Dundas (CA); Robert Langerak, Burlington (CA); Denis Guibert, Hamilton (CA); Hamid Rabie, Mississauga (CA)

(73) Assignee: Zenon Environmental Inc., Oakville (CA)

( * ) Notice: Subject to any disclaimer, the term of this patent is extended or adjusted under 35 U.S.C. 154(b) by 91 days.

(21) Appl. No.: 09/848,012

(22) Filed: May 3, 2001

(65) Prior Publication Data

US 2001/0027951 A1 Oct. 11, 2001

Related U.S. Application Data

(63) Continuation-in-part of application No. 09/488,359, filed on Jan. 19, 2000, now Pat. No. 6,245,239, which is a continuation of application No. PCT/CA99/00940, filed on Oct. 7, 1999, and a continuation-in-part of application No. 09/414,370, filed on Oct. 7, 1999.

(60) Provisional application No. 60/201,725, filed on May 4, 2000, provisional application No. 60/116,591, filed on Jan. 20, 1999, and provisional application No. 60/103,665, filed on Oct. 9, 1998.

(30) Foreign Application Priority Data

| Jan. 14, 1999 | (CA) | 2258715 |
| Jul. 20, 1999 | (CA) | 2278085 |
| Jul. 30, 1999 | (CA) | 2279766 |
| May 4, 2000 | (CA) | 2307492 |

(51) Int. Cl.$^7$ .................. B01D 63/00; B01D 61/00
(52) U.S. Cl. ............... 210/321.8; 210/321.88; 210/321.89; 210/636; 210/321.69; 210/321.9; 210/650

(58) Field of Search ............... 210/650, 651, 210/636, 321.8, 321.9, 321.69, 321.88, 321.89

(56) References Cited

U.S. PATENT DOCUMENTS

| 5,209,852 | A | * | 5/1993 | Sunaoka et al. |
| 5,248,424 | A | * | 9/1993 | Cote et al. |
| 5,480,553 | A | | 1/1996 | Yamamori et al. .......... 210/650 |
| 5,639,373 | A | * | 6/1997 | Mahendran et al. |

(List continued on next page.)

FOREIGN PATENT DOCUMENTS

| EP | 0 598 909 B1 | 1/1998 |
| EP | 0 931 582 A1 | 7/1999 |

(List continued on next page.)

Primary Examiner—Ana Fortuna
(74) Attorney, Agent, or Firm—Andrew Alexander

(57) ABSTRACT

An element of immersed, suction driven, filtering membranes has a plurality of hollow fiber membranes suspended between upper and lower headers. The lower header is movable between a first position in which the fibers are substantially elongated and second position in which the two headers are closer to each other by between 1 and 4% of the un-potted length of the membranes. The weight of the lower header is sufficient to keep the lower header in the first position in substantially quiescent water while allowing the lower header to rise to the second position in upwardly flowing water. Aerators are mounted generally below the elements and supply scouring bubbles to each element at a higher rate and then at a rate less than one half of the higher rate in repeated cycles. The cycles are preferably between 10 seconds and 60 seconds in duration. The lower header rises to the second position when bubbles are supplied at the higher rate and falls to the first position when bubbles are supplied at the lower rate.

17 Claims, 4 Drawing Sheets

U.S. PATENT DOCUMENTS

| | | | |
|---|---|---|---|
| 5,647,988 A | * | 7/1997 | Kawanishi et al. |
| 5,783,083 A | * | 7/1998 | Henshaw et al. |
| 5,944,997 A | * | 8/1999 | Pedersen et al. |
| 6,027,649 A | * | 2/2000 | Renedek et al. |
| 6,156,200 A | * | 12/2000 | Zha et al. |
| 6,193,890 B1 | * | 2/2001 | Pedersen et al. |
| 6,319,411 B1 | * | 11/2001 | Cote |

FOREIGN PATENT DOCUMENTS

| | | |
|---|---|---|
| JP | 7185271 | 7/1995 |
| JP | 8323161 | 12/1996 |
| JP | 20000288359 A | 10/2000 |
| WO | 98/28066 | 7/1998 |
| WO | 00/21890 | 4/2000 |

* cited by examiner

AERATED IMMERSED MEMBRANE SYSTEM

This is a continuation-in-part application of U.S. Ser. No. 09/414,370 filed Oct. 7, 1999 and a continuation-in-part application of U.S. Ser. No. 09/488,359 filed Jan. 19, 2000 now U.S. Pat. No. 6,245,239, which is a continuation of PCT Application No. PCT/CA99/00940, filed Oct. 7, 1999, and also claims priority from Canadian patent application No. 2,307,492 and U.S. Provisional application Ser. No. 60/201,725 both filed on May 4, 2000. Each of the foregoing applications is incorporated by reference thereto as if fully set forth herein.

FIELD OF THE INVENTION

This invention relates to filtering membranes and particularly to modules of immersed, suction driven, filtering membranes used to filter water or wastewater and cleaned in part by scouring air bubbles.

BACKGROUND OF THE INVENTION

Submerged membranes are used to treat liquids containing solids to produce filtered liquid lean in solids and an unfiltered retentate rich in solids. For example, submerged membranes are used to withdraw substantially clean water from wastewater and to withdraw potable water from a lake or reservoir.

Immersed membranes are generally arranged in elements or modules which comprise the membranes and headers attached to the membranes. The modules are immersed in a tank of water containing solids. A transmembrane pressure ("TMP") is applied across the membrane walls which causes filtered water to permeate through the membrane walls. Solids are rejected by the membranes and remain in the tank of water to be biologically or chemically treated or drained from the tank.

U.S. Pat. No. 5,639,373 issued to Zenon Environmental Inc. on Jun. 17, 1997 describes one such module using hollow fibre membranes. In this module, hollow fibre membranes are held in fluid communication with a pair of vertically spaced headers. TMP is provided by suction on the lumens of the fibres through the headers. Similar modules are shown in U.S. Pat. No. 5,783,083 issued to Zenon Environmental Inc. on Jul. 21, 1998, PCT Publication No. WO 98/28066 filed on Dec. 18, 1997 by Memtec America Corporation and European Patent Application No. EP 0 931 582 filed Aug. 22, 1997 by Mitsubishi Rayon Co., Ltd.

To clean such membrane modules, bubbles are introduced to the tank through aerators mounted below or near the bottom of the membrane. The bubbles rise to the surface of the tank water and create an air lift which recirculates tank water around the membrane module. The rising bubbles and tank water scour and agitate the membranes to inhibit solids in the tank water from fouling the pores of the membranes. Further, there is also an oxygen transfer from the bubbles to the tank water which, in wastewater applications, provides oxygen for microorganism growth.

One concern with such aerated immersed membrane modules is that the tank water to move in a generally steady state recirculation pattern in the tank. The recirculation pattern typically includes "dead zones" where tank water is not reached by the recirculating tank water and bubbles. The parts of the membranes in these dead zones are not effectively cleaned and may be operating in water having a higher concentration of solids than in the tank water generally. Accordingly, the affected parts of these membranes quickly foul with solids. This problem persists even in modules where membranes are installed with a small degree of slack to allow the membranes to move and shake off or avoid trapping solids. The movement of water in the tank encourages the slackened membranes to assume a near steady state position near the headers which interferes with the useful movement of the membranes. As a result, the entire surface of the membranes is not effectively cleaned and parts of the membrane foul rapidly. In wastewater applications in particular, sludge often builds up around the membranes in an area directly above the lower header and an area directly below the upper header. 15% or more of the surface area of the membranes may quickly become covered in sludge and lose nearly all of its permeability.

SUMMARY OF THE INVENTION

U.S. Provisional Application No. 60/103,665, filed Oct. 9, 1998 by Cote, made non-provisional as U.S. application Ser. No. 09/414,370 filed Oct. 7, 1999 by Cote, describes a cassette of filtering membranes suspended from a horizontal pivot located above the center of gravity of the cassette. Aerators are provided below the cassette on opposite sides of the pivot. A supply of air is cycled from the aerators on one side of the pivot to the aerators on the other side. This causes the cassette to oscillate, the aerated side rising while the non-aerated side falls.

PCT Application No. PCT/CA99/00940, filed on Oct. 9, 1999 by Zenon Environmental Inc. et al, and continued in the US by Cote et al. on Jan. 19, 2000 as application Ser. No. 09/488,359, describes among other things a method and apparatus for reducing the build up of sludge on vertical membranes near the headers. The apparatus includes an aeration system having a plurality of distinct branches and one or more aerators in fluid communication with the each distinct branch. An air supply provides an initial air flow at an initial flow rate and a valve set is provided in fluid communication with the air supply and having distinct outlets in fluid communication with the distinct branches of the air distribution system. The valve set is operable to (i) split the initial air flow such that at any point in time at least one of the distinct branches of air distribution system receives air at a higher flow rate and at least one other of the distinct branches of the air distribution network receives air at a lower flow rate, the lower flow rate being less than one half of the higher flow rate, and (ii) switch which branch or branches of the air delivery network receive air at the higher flow rate and the lower flow rate in repeated cycles of very short duration. The aerators associated with a first distinct branch of the air delivery system are interspersed with the aerators associated with a second distinct branch of the air delivery system. With sufficiently short cycle times, the water to be filtered moves horizontally under transient flow. When used with membranes oriented vertically between upper and lower headers, the horizontal and transient movement encourages movement of the fibres and penetration of the tank water into the fibres to help prevent a build up of sludge around the headers.

It is an object of the present invention to provide an element or cassette of immersed, suction driven, filtering membranes used to filter water or wastewater which may be cleaned in part by scouring air bubbles. The present invention is particularly adapted to filtering water with a high concentration of suspended solids.

In some aspects, the invention is directed at an element of filtering hollow fibre membranes having an upper header and a lower header. A plurality of hollow fibre membranes are attached to and suspended between the headers for collecting permeate through at least one of the headers. The lower header is movable between a first position in which the fibres are substantially elongated and second position in which the two headers are closer to each other by between 0.1 and 5% of the un-potted length of the membranes. The weight of the lower header is sufficient to keep the lower header in the first position in substantially quiescent water while allowing the lower header to rise to the second position in upwardly flowing air and water.

A module of filtering hollow fibre membranes is made by attaching one or more of the elements to a frame. The frame fixedly secures the upper header but merely restrains the lower header while allowing it to move between the first position and the second position. Aerators are mounted generally below the elements and supply scouring bubbles to each element at a higher rate and then at a rate less than one half of the higher rate in repeated cycles. The cycles are preferably between 10 seconds and 60 seconds in duration. The lower headers rise to the second position when bubbles are supplied at the higher rate and fall to the first position when bubbles are supplied at the lower rate.

In other aspects, the invention is directed at a process for treating water with filtering hollow fibre membranes of the type that have a plurality of hollow fibre membranes attached to and suspended between a pair of headers. The membranes are provided in elements, each element being a rectangular skein of hollow fibres having an effective thickness of between 4 and 8 sheets of hollow fibres. Adjacent elements are horizontally spaced apart, preferably by at least one third of the width of the headers measured in the direction of the horizontal spacing. Suction is applied to the interior of the hollow fibre membranes to withdraw a filtered permeate. During permeation, scouring bubbles are provided from below the elements. The supply of the scouring bubbles varies between a higher rate and a rate less than one half of the higher rate in repeated cycles. The cycles are between 10 seconds and 60 seconds in duration. The distance between the headers is between 95% and 99.9% of the un-potted length of the hollow fibre membranes for at least a substantial part of the time during which bubbles are supplied at the higher rate.

In yet other aspects of the invention, at least one header moves during permeation between the first position and the second position while scouring bubbles are supplied in repeated cycles as described above. Preferably the lower header moves upwards to the second position when bubbles are supplied at the higher rate and moves downwards to the lower position when bubbles are supplied at the lower rate.

BRIEF DESCRIPTION OF THE DRAWINGS

Preferred embodiments of the present invention will now be described with reference to the following figures.

DETAILED DESCRIPTION OF EMBODIMENT

Figures 1, 2:
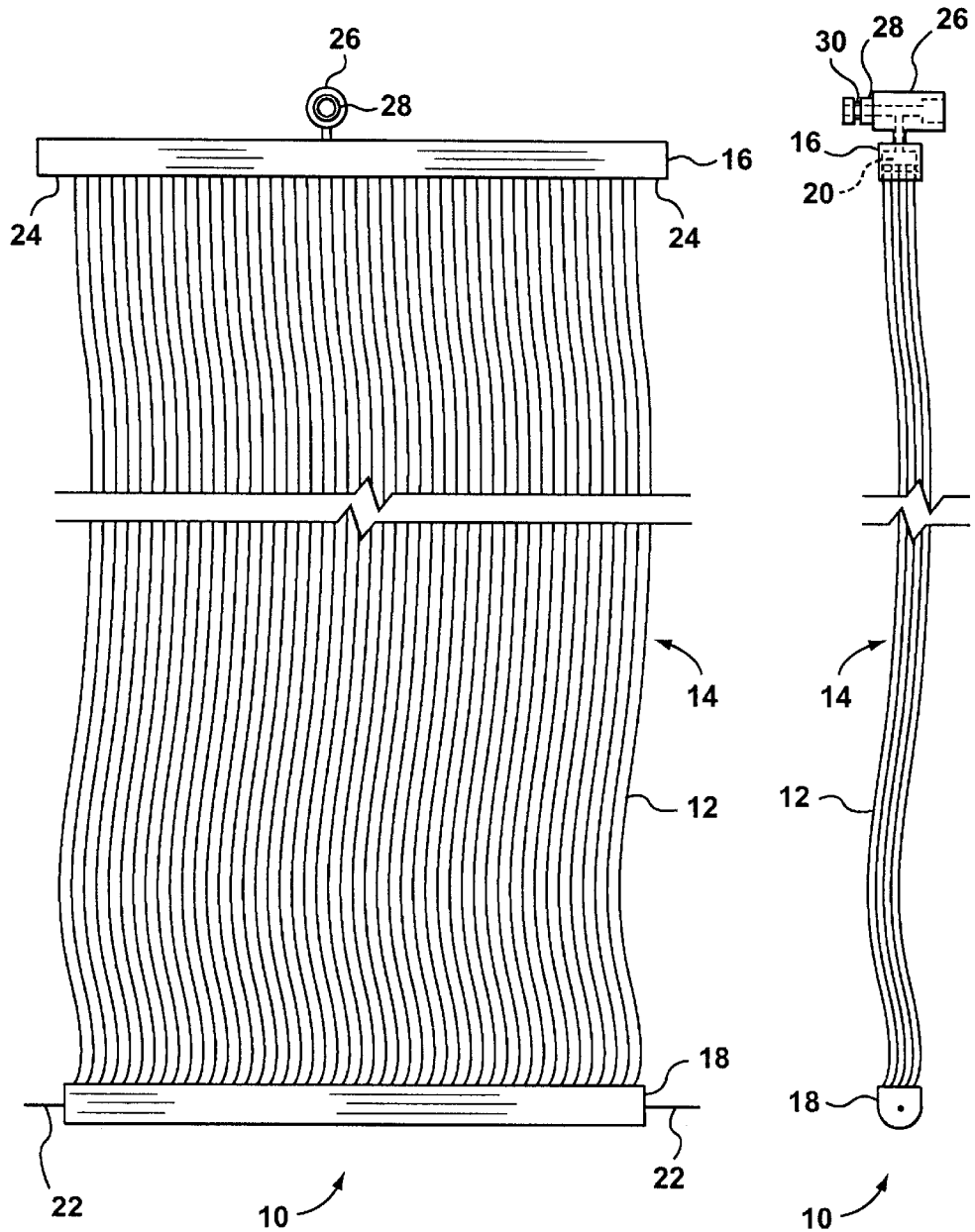
FIG. 1 is a front elevation of a filtering element.
FIG. 2 is a side elevation of the filtering element of FIG. 1.

FIGS. 1 and 2 show front and side elevations respectively of a filtering element 10. The element 10 has a plurality of hollow fibre membranes 12 in the form of a rectangular skein 14 suspended between an upper header 16 and a lower header 18. The rectangular skeins 14 are between four and eight layers of membranes 12 deep (five layers being shown in FIG. 2), less frequently up to 12 layers deep, and are in the range of several tens of membranes 12 wide. The membranes 12 typically have an outside diameter between 0.4 mm and 4.0 mm. The length of the membranes 12 is chosen to maximize flux for a given cost according to relationships known in the art and is typically between 400 mm and 1,800 mm. The membranes 12 have an average pore size in the microfiltration or ultrafiltration range, preferably between 0.003 microns and 10 microns and more preferably between 0.02 microns and 1 micron.

The upper header 16 has a permeate channel 20 in fluid communication with the lumens of the membranes 12. The membranes are potted into the upper header such that the membranes 12 are all closely spaced apart from each other. This allows potting resin to completely surround the outside of the end of each membrane 12 to provide a watertight seal so that water can only enter the permeate channel after first flowing though the membranes 12. Suitable potting resins include polyurethane, epoxy, rubberized epoxy and silicone resin. One or more resins may also be used in combination to meet objectives of strength and providing a soft interface with the membranes 26 having no cutting edges.

The inventors prefer to use a potting method like that described in U.S. Pat. No. 5,639,373 which is incorporated herein by this reference and which produces layers of membranes 12, but other potting methods known in the art may also be used. In particular, the inventors prefer to use the methods described in Canadian Patent Application No. 2,308,234 filed May 5, 2000 by Zenon Environmental Inc. and in a U.S. application filed on May 3, 2001 by Rabie et al. entitled Gel Potting Method and Method to Reduce Twinning for Filtering Hollow Fibre Membranes, both of which are incorporated herein by this reference. Regardless of potting method, the thickness of the assembled mass of membranes 12 is preferably between 18 and 40 mm. Typical headers 16, 18 to accommodate such masses of membranes are 40 to 50 mm wide. Typical potting densities are between 10% and 40%. A preferred element 10 uses membranes 12 from a commercially available ZW 500 (TM) module made by Zenon Environmental Inc. which have an outside diameter of about 2 mm, an un-potted length (meaning the unsupported length of membrane 12 between the upper header 16 and lower header 18) of 1,600 to 1,900 mm, and a pore size of approximately 0.1 microns.

In the embodiment shown, permeate is not withdrawn from the lower header 18. The membranes are plugged with resin at their lower ends and glued into the lower header 18. Preferably, the width of the lower header 18 is as little as possible more than the width of the membranes 12. The membranes 12 might also be made of looped fibres with their looped ends glued into the lower header 18, but if this is done the loops should be oriented to minimize the depth of the assembly. If long membranes 12 are desired (for example to better fit in a deep tank) a permeating lower header may be preferred to reduce head loss of permeate flow in the lumens of the membranes 12. Membranes 12 would be potted in such a lower header as described for the upper header 16.

The upper header 16 and lower header 18 are preferably injection moulded from a suitable plastic such as PE, PP, polyester or polycarbonate. The lengths of the headers 16, 18 may vary considerably but lengths less than 1 m are more convenient for injection moulding. The lower header 18 has pins 22 which extend beyond the membranes 12. The length of the upper header 16 also extends beyond the membranes 12 by about 25 mm to form abutments 24.

A permeate fitting 26 is attached to the top of the upper header 16. One side of the permeate fitting 26 has a projection 28 with a groove 30 for an O-ring. The other side of the permeate fitting 26 has a recess 32 adapted to receive the projection 28 of an adjacent permeate fitting 26. Thus, adjacent elements 10 can be releasably sealed to each other. The projections 28 and recesses 32 of the permeate fitting 26 are made with excess length to allow adjacent elements 10 to be mounted at varying distances apart, preferably ranging from as closely as one third of the of the width of the headers 16, 18 (measured in the direction of the horizontal spacing) to the width of the headers 16, 18.

Figure 3:
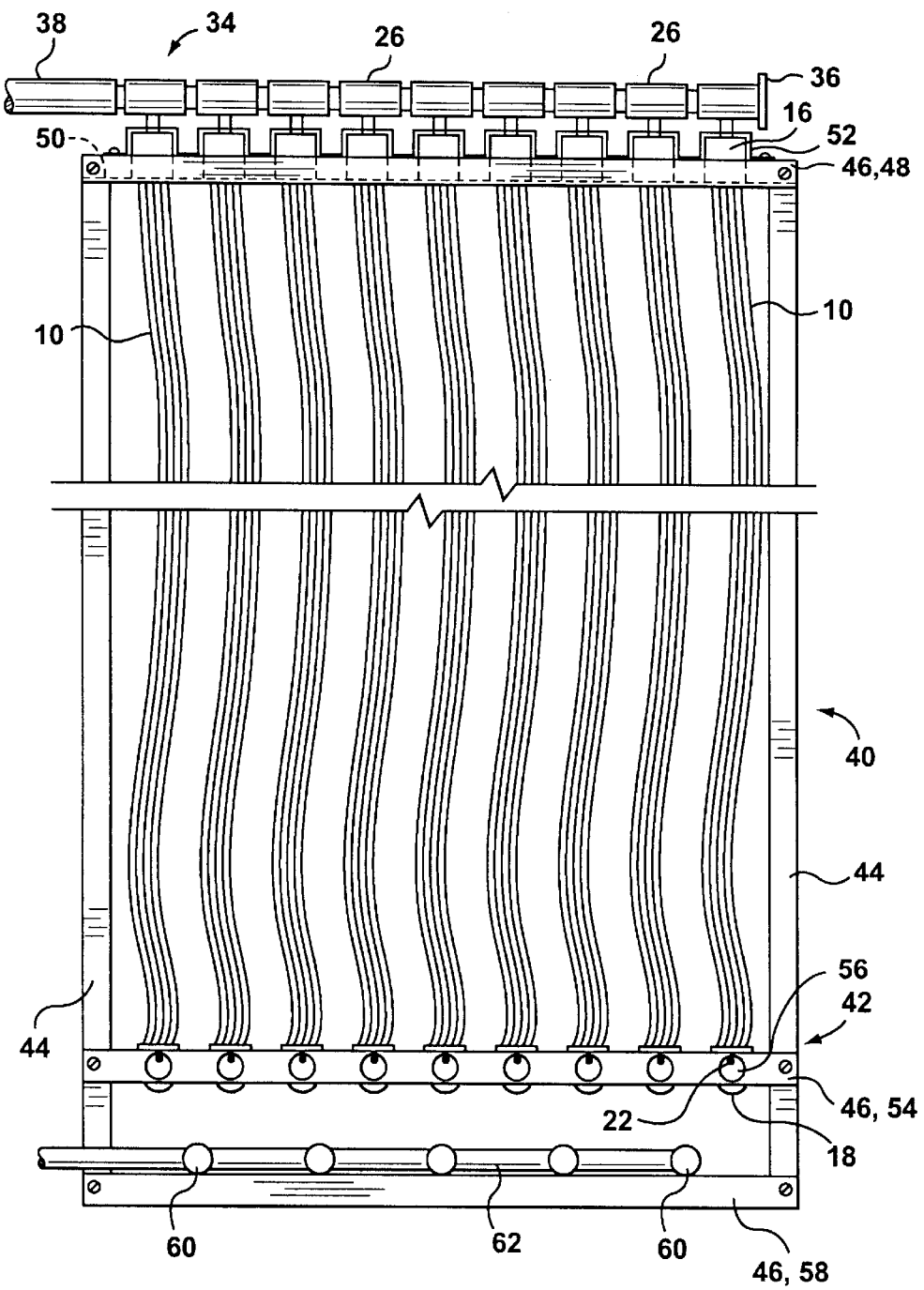
FIG. 3 is a front elevation of a filtering module containing the filtering elements of FIGS. 1 and 2.

FIG. 3 shows a cassette 40 made of a plurality of adjacent elements 10. The permeate fittings 26 of adjacent elements 10 seal to each other as described above to create a continuous permeate header 34. A cap 36 seals one end of the permeate header 34 while a permeate pipe 38 s connected into the other end of the permeate header 34.

The cassette 40 is made with a steel frame 42 having stiles 44 and rails 46 bolted together. An upper rail 48 is made of a right angled section oriented to provide a ledge 50 which receives the abutments 24 of the upper headers 16. A removable indexed rod 52 covers the upper headers 16 and holds them in horizontally spaced relationship. Thus the upper headers 16 are fixed to the upper rail 48. By removing the indexed rod 52, however, the elements 10 can slide towards or away from adjacent elements 10. The permeate fitting 26 of any particular element 10 can be disconnected from the permeate header 34 by sliding all adjacent permeate fittings 26 away from it to allow an element 10 to be removed from the cassette 40.

A lower rail 54 is attached to the stiles 44 and has several openings 56 which admit the pins 22 of the lower headers 18. The openings 56 restrain the pins 22 of the lower headers 18 within a selected range of movement between a first position and a second position. In the first position, the pins 22 are in their lowest possible position and membranes 12 are substantially elongated. Where the membranes 12 have sufficient tensile strength, the weight of the lower headers 18 pulls on the membranes 12 and the lowest point of the openings 56 can be below the pins 22 in the first position. For membranes 12 with less tensile strength, however, the lowest point of the openings 56 contacts the pins 22 in the first position to relieve the tensile stress on the membranes 12 caused by the weight of the lower headers. In the second position (shown in FIG. 3), the headers 16, 18 are a selected distance closer to each other, the selected distance being 0.1% to 5% of the un-potted or free length of the membranes 12. A selected distance of 10 mm was used with the ZW 500 membranes described above.

In the second position, the pins 22 contact the highest point of the openings. Although the openings 56 are shown as circular, they may also be rectangular in shape and permit movement from side to side of the cassette 40 as well as up and down but are preferably slots permitting mostly up and down movement. The movement from side to side can be made adjustable by using a C-channel for the lower rail 54 with a long horizontal slot defining the highest and lowest points of the openings 56 and a series of vertical bolts through the flanges of the C-channel to define the sides of the openings 56. A space between the lower rails 54 and the lower headers 18 may also permit some movement of the lower headers 18 from the front to the back of the cassette 40. Temporarily unbolting one of the lower rails 54 allows individual elements 10 to be removed from the cassette 40.

In an alternative embodiment, the lower headers do not have pins but instead have cavities or attached slotted plates on the sides of the lower headers. A number of threaded holes are made in the lower rails in locations corresponding to the cavities or slots in the slotted plates. Bolts are screwed into the threaded holes and protrude into the cavities or slots. With this construction, any single lower header can be removed from a frame by unscrewing the relevant bolts.

In another alternative embodiment, the ends of adjacent spaced apart lower headers are fixed together with a bar or plate so that they move upwards or downwards together and may not rotate relative to each other. Rotation of the headers can also be controlled by using two pins for each end of the lower header and a lower rail with slotted openings.

An aerator rail 58 is bolted to the stiles 44 below the lower rail 48. The aerator rail 58 supports several conduit aerators 60 connected to an aerator manifold 62 to receive a supply of air. The conduit aerators are configured to provide a supply of scouring bubbles to the elements 10 from below them. The conduit aerators 60 have an elongated hollow body which is a circular pipe having an internal diameter between 15 mm and 100 mm. A series of holes pierce the body allowing air to flow out of the conduit aerator 60 to create bubbles. The size, number and location of holes may vary but 2 holes (one on each side) placed every 50 mm to 100 mm along the body are suitable.

Scouring bubbles are produced at the holes of the aerators 60 and agitate the membranes 12 which inhibits their fouling or cleans them. In addition, the bubbles also decrease the local density of tank water in or near the membranes 12 which causes tank water to flow upwards past the membranes. The bubbles have an average diameter between 3 mm and 50 mm. Bubbles of this size are typically produced in municipal treatment works with holes between 2 mm and 15 mm in diameter. The scouring bubbles are typically air bubbles but oxygen, nitrogen or other suitable gases may also be used.

Figure 4:
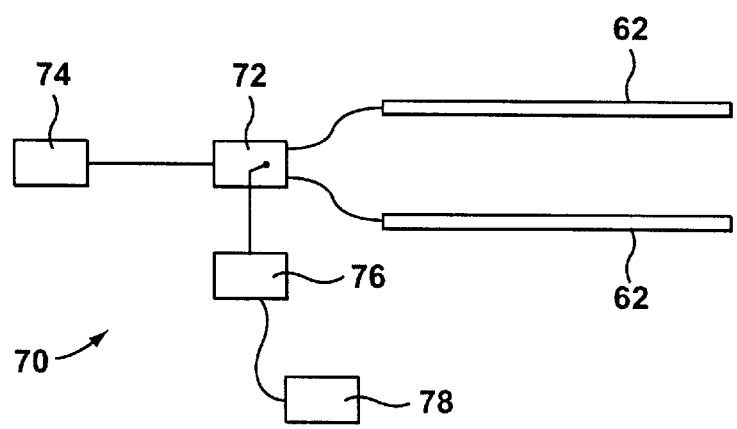
FIG. 4 is a schematic representation of an aeration system.

FIG. 4 shows an aeration system 70 for use with cassettes 40 described above. Two aerator manifolds 62 are shown which each service a set of elements 10 ranging in size from one half of a cassette 40 to several cassettes 40. The manifolds 62 are connected to a three way valve 72 which splits the flow from an air blower 74 such that one manifold 62 receives air at a higher rate and the other manifold 62 receives air at a lower rate. The lower rate ranges from no flow to flow at one half of the higher rate. A solenoid 76 is connected to the three way valve 72 and operable to switch which manifold receives air at the higher and lower rates. A programmable logic controller (PLC) 78 controls the solenoid. Preferably, the PLC is programmed to activate the solenoid in cycles between 10 seconds and 60 seconds in duration wherein each manifold 62 receives air at the higher rate for one half of each cycle. Other suitable aeration systems are described in PCT Application No. PCT/CA99/00940, filed on Oct. 9, 1998 by Zenon Environmental Inc. et al. and a U.S. application called Cyclic Aeration System for Submerged Membrane Modules filed Mar. 23, 2001 by Rabie et al., both of which are incorporated herein by this reference.

The air flow provided to a manifold 62 or aerator 60 is measured by its superficial velocity meaning the rate of air flow in $m^3/S$ at standard conditions (1 atmosphere and 20 degrees Celsius) divided by the cross sectional area effectively aerated by a manifold 62 or aerator 60 in $m^2$. The higher flow rate preferably has a superficial velocity between 0.013 m/s and 0.15 m/s. A particular higher rate is chosen to inhibit fouling of the membranes 12 to a desired degree. Supplying air at the higher rate will, however, be sufficient to cause tank water surrounding the elements 10 to flow upwards. The weight of the lower headers 18 is chosen to allow the lower headers 18 to rise to the second position in this upwardly flowing water. Aeration at the lower rate may also produce some upward movement of the tank water, but conditions in the tank are preferably substantially quiescent during aeration at the lower rate. During aeration at this rate the weight of the lower headers 18 pulls the lower headers into the first position. Thus the lower headers 18 move upwards when scouring bubbles are supplied at the higher rate and move downwards when scouring bubbles are supplied at the lower rate.

In operation, one or more elements 10 or cassettes 40 are immersed in an open tank of water or wastewater to be filtered. Feed water is supplied to the tank as is known in the art. Suction (provided for example by a permeate pump), typically between 1 kPa and 150 kPa, is applied to the interior of the hollow fibre membranes though the permeate pipe 38, permeate header 34 and permeate fittings 26 to withdraw filtered permeate. During permeation, scouring bubbles are provided from below the elements 10 as described above and the lower headers 18 move between the first position and second position. The membranes 12 are typically also backwashed and cleaned with chemicals as is known in the art. Similarly, the tank water is periodically or continuously deconcentrated as in known in the art.

The process is best suited to filter water having a high concentration of suspended solids, particularly wastewater, where aeration is provided throughout permeation. The inventors believe, however, that the apparatus and method described above may also be adapted for use with methods of filtering water with lower concentrations of suspended solids, For example, the method and apparatus might be used where aeration is provided only during a portion of the permeation cycle or during backwashing provided that aeration is used for a long enough period to include multiple cycles.

EXAMPLE

Figure 5:
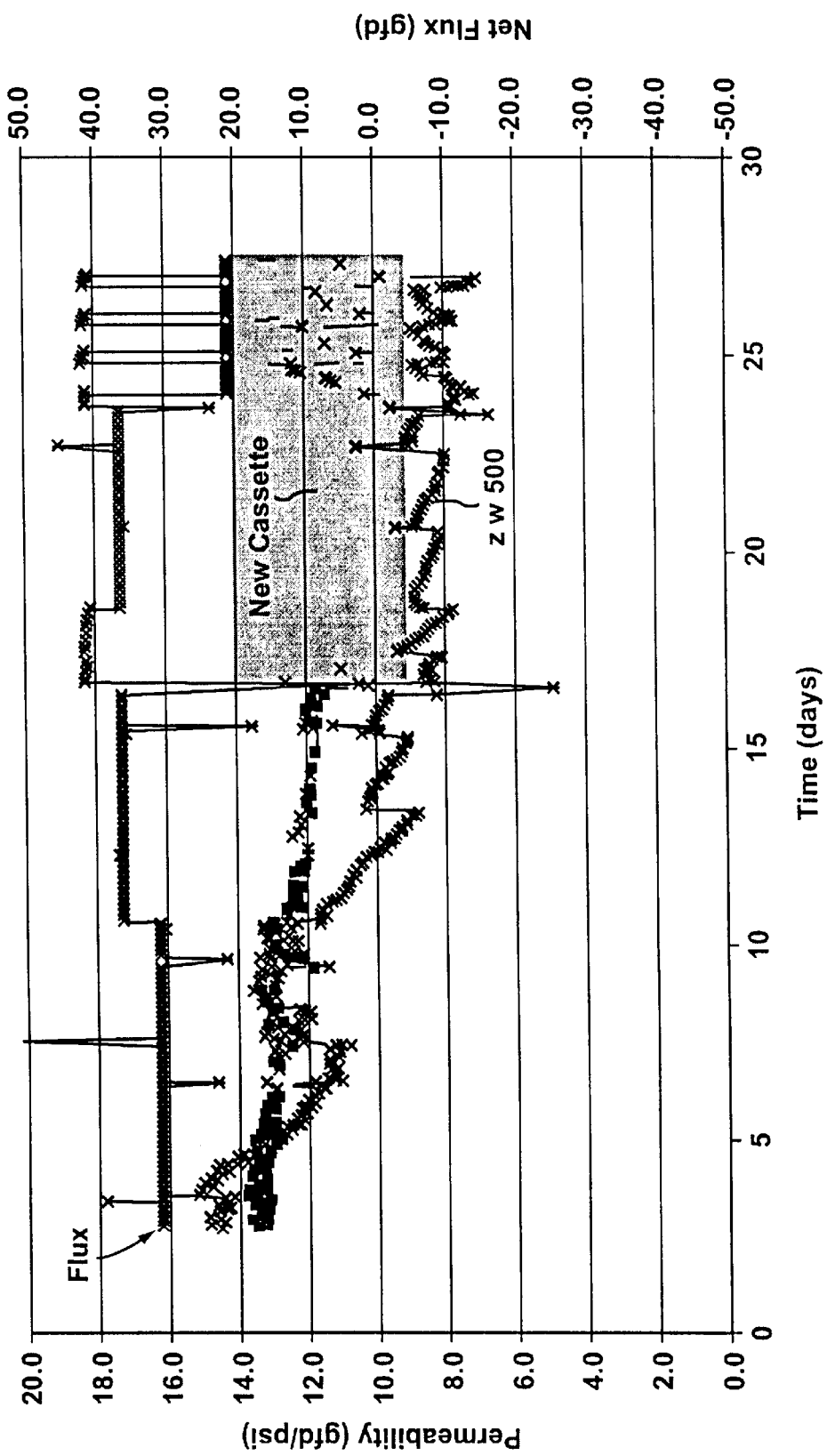
FIG. 5 is a chart of experimental data.

A new cassette was built as described above except that adjacent elements were joined to a common upper header. The new cassette was used to filter wastewater with MLSS of 15 g/beside a cassette of ZW500 (TM) membrane modules in a reactor having HRT of 5 hours and SRL of 20 days. The same membrane size and chemistry were used in both cassettes. The flux from both cassettes was as shown in FIG. 5. Aeration was provided at a superficial velocity of 0.04 m/s in a 20 second cycle. Permeability of the membranes was measured before backwashing and corrected to 20 C.

FIG. 5 shows the permeability of the new cassette and the ZW 500 (TM) cassette over time. The new cassette shows a marked improvement in long term permeability. Weekly visual observations showed that the new cassette had no solid accumulation adjacent the bottom header while the ZW 500 (TM) cassette had 4 to 8 inches of solid accumulation adjacent the bottom header.

It is to be understood that what has been described are preferred embodiments of the invention. The invention nonetheless is susceptible to certain changes and alternative embodiments without departing from the subject invention, the scope of which is defined in the following claims.

We claim:

1. An element of filtering hollow fibre membranes comprising:
   (a) a fixed upper header;
   (b) a lower header;
   (c) a plurality of hollow fibre membranes attached to and suspended between the headers, the hollow fibre membranes having each at least one open end and having each an outer surface, the outer surface of the open ends of the membranes connected to at least one header with a water impermeable connection; and
   (d) one or more permeate channels in at least one of the headers in fluid communication with the interior of the hollow fibre membranes for collecting permeate, wherein,
   (e) the lower header is movable between a first position in which the fibres are substantially elongated and second position in which the headers are a selected distance closer together; and
   (f) the weight of the lower header is sufficient to keep the lower header in the first position in substantially quiescent water while allowing the lower header to rise to the second position in upwardly flowing water or water and bubbles.

2. The element of claim 1 wherein the selected distance is 0.1% to 5% of the un-potted length of the hollow fibres.

3. A module of filtering hollow fibre membranes comprising:
   (a) one or more elements, each element having:
      (i) an upper header;
      (ii) a lower header;
      (iii) a plurality of hollow fibre membranes attached to and suspended between the headers, the hollow fibre membranes having each at least one open end and having each an outer surface, the outer surface of the open ends of the membranes connected to at least one header with a water impermeable connection; and
      (iv) one or more permeate channels in at least one of the headers in fluid communication with the interior of the hollow fibre membranes for collecting permeate; and
   (b) a frame for:
      (i) fixedly securing the upper header;
      (ii) restraining the lower header within a selected range of movement between a first position in which the fibres are substantially elongated and second position in which the headers are a selected distance closer together, wherein,
   (c) the weight of the lower header is sufficient to keep the lower header in the first position in substantially quiescent water while allowing the lower header to rise to the second position in upwardly flowing water or water and bubbles.

4. The module of claim 3 wherein the selected distance is 0.1% to 5% of un-potted length of the hollow fibre membranes.

5. The modules or elements of any of claims 1 through 4 inclusive further comprising aerators mounted below the elements and operable to supply scouring bubbles to each element at a higher rate and then at a rate less than one half of the higher rate in repeated cycles.

6. The invention of claim 5 wherein the cycles are between 10 seconds and 60 seconds in duration.

7. The module of claim 3 having a plurality of elements placed side by side but horizontally spaced apart by at least one third of the width of the headers measured in the direction of the horizontal spacing.

8. The invention of claim 7 wherein the horizontal spacing is variable.

9. The module of claim 3 having a plurality of elements placed side by side but spaced apart and having the lower headers of the elements fixed together so that they move upwards or downwards together and may not rotate relative to each other.

10. A process for treating water with filtering hollow fibre membranes comprising:
   (a) providing a plurality of elements of filtering hollow fibre membranes each having,
      (i) an upper header;
      (ii) a lower header;
      (iii) a plurality of hollow fibre membranes attached to and suspended between the headers, the hollow fibre membranes having each at least one open end and having each an outer surface, the outer surface of the open ends of the membranes connected to at least one header with a water impermeable connection, the headers capable of movement relative to each other; and
      (iv) one or more permeate channels in at least one of the headers in fluid communication with the interior of the hollow fibre membranes for collecting permeate; and
      (v) a frame which fixedly secures said upper header and restrains said lower header within a range of movement including a first position and a second position, the second position being above the first position, the weight of the lower header sufficient to keep the lower header in the first position in substantially quiescent water while allowing the lower header to rise to the second position in upwardly flowing bubbles;
   (b) applying suction to the interior of the hollow fibre membranes to withdraw a filtered permeate;
   (c) providing a supply of scouring bubbles from below the elements; and
   (d) varying the supply of scouring bubbles from a higher rate to a rate less than one half of the higher rate in repeated cycles, said lower header moving upwards when the bubbles are supplied at said higher rate and moving downwards when said bubbles are supplied at said lower rate.

11. The process of claim 10 wherein the distance between the headers is between 95% and 99.9% of the un-potted length of the hollow fibre membranes for at least a substantial part of the time during which bubbles are supplied at the higher rate.

12. The process of claims 10 or 11 wherein the cycles are between 10 seconds and 60 seconds in duration.

13. The process of claim 12 wherein the higher rate has a superficial velocity of between 0.013 m/s and 0.15 m/s.

14. A process for treating water with filtering hollow fibre membranes comprising:
   (a) providing one or more elements of filtering hollow fibre membranes each having,
      (i) an upper header;
      (ii) a lower header;
      (iii) a plurality of hollow fibre membranes attached to and suspended between the headers, the hollow fibre membranes having each at least one open end and having each an outer surface, the outer surface of the open ends of the membranes connected to at least one header with a water impermeable connection, the headers capable of movement relative to each other between a first position in which the fibres are substantially elongated and a second position in which the headers are a selected distance closer together, the weight of the lower header being sufficient to keep the lower header in the first position in substantially quiescent water while allowing the lower header to rise to the second position in upwardly flowing bubbles; and
      (iv) one or more permeate channels in at least one of the headers in fluid communication with the interior of the hollow fibre membranes for collecting permeate;
   (b) applying suction to the interior of the hollow fibre membranes to withdraw a filtered permeate; and
   (c) providing a supply of scouring bubbles from below the elements, the supply of scouring bubbles varying between a higher rate and a lower rate that is less than one half of the higher rate in repeated cycles, the scouring bubbles, when supplied at the lower rate, permitting the lower header to move into the first position and, when supplied at the higher rate, causing the header to move into the second position.

15. The process of claim 14 wherein the selected distance is 0.1% to 5% of fibre length.

16. The process of claim 14 wherein the cycles are between 10 seconds and 60 seconds in duration.

17. The process of claim 14 wherein the higher rate has a superficial velocity of between 0.013 m/s and 0.15 m/s.

* * * * *